BEST AVAILABLE COPY

July 9, 1963 R. G. REINEMAN ET AL Des.-Re. 25,414

TABLE OR THE LIKE

Original Filed April 11, 1960

Inventors.
Richard G. Reineman.
George E. Schaefer.
By. Hofgren, Brody,
Wegner, Allen & Stellman
Attorneys.

United States Patent Office

Re. 25,414
Reissued July 9, 1963

25,414

TABLE OR THE LIKE

Richard G. Reineman, Balboa, Calif., and George E. Schaefer, Muskegon Heights, Mich., assignors to Brunswick Corporation, Chicago, Ill., a corporation of Delaware Original No. 188,669, dated Aug. 23, 1960, Ser. No. 60,121, Apr. 11, 1960, for 14 years. Application for reissue Aug. 23, 1962, Ser. No. 71,523. Term of patent 14 years (Cl. D34—5)

Matter enclosed in heavy brackets [ ] appears in the original patent but forms no part of this reissue specification; matter printed in italics indicates the additions made by reissue.

Figure 1:
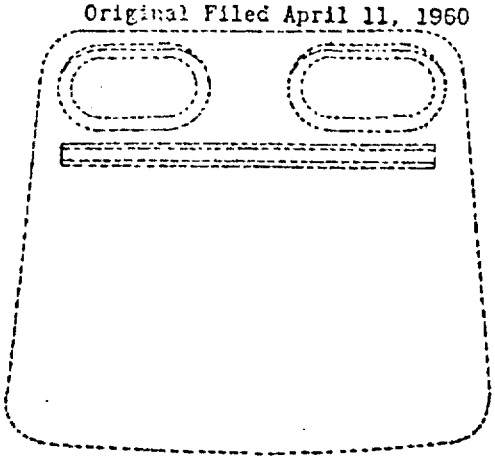
FIG. 1 is at top plan view of a [score] table or the like, showing our new design.
Figure 2:
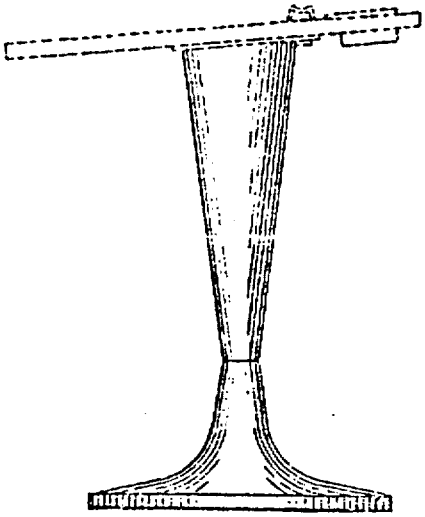
FIG. 2 is a side elevational view thereof.
Figure 3:
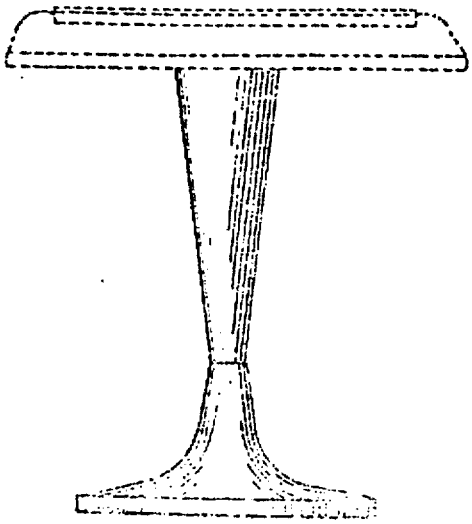
FIG. 3 is a front elevational view thereof.

The dominant features of our design are shown in full lines on the drawings.

We claim:

The ornamental design for a [score] table or the like, as shown and described.

References Cited in the file of this patent or the original patent

| | | |
|---|---|---|
| D. 175,646 | Reineman | Sept. 20, 1955 |
| D. 179,633 | Fox | Feb. 5, 1957 |
| D. 187,941 | Latham | May 17, 1960 |
| 145,145 | Baggs | Dec. 2, 1873 |
| 2,560,659 | Payeur | July 17, 1951 |